(12) United States Patent
Korst et al.

(10) Patent No.: US 6,446,162 B1
(45) Date of Patent: Sep. 3, 2002

(54) STORAGE SYSTEM

(75) Inventors: Johannes H. M. Korst, Eindhoven; Pascal F. A. Coumans, Geleen, both of (NL)

(73) Assignee: KoninklijkePhilips ElectronicsN. V., Eindhoven (NL)

( * ) Notice: Subject to any disclaimer, the term of this patent is extended or adjusted under 35 U.S.C. 154(b) by 0 days.

(21) Appl. No.: 09/428,774

(22) Filed: Oct. 28, 1999

(30) Foreign Application Priority Data

Oct. 30, 1998 (EP) .............................. 98203681

(51) Int. Cl.$^7$ .............................. G06F 12/00
(52) U.S. Cl. .................. 711/114; 710/6; 369/47.1; 365/200
(58) Field of Search .............. 711/114; 710/6; 369/34; 365/200

(56) References Cited

U.S. PATENT DOCUMENTS 5,287,459 A * 2/1994 Gniewek .............. 369/34
5,926,649 A * 7/1999 Ma et al. ............ 710/6

OTHER PUBLICATIONS

Berson et al., "Randomized Data Allocation for Real–Time Disk I/O", $41^{st}$ IEEE Computer Society International Conference, Santa Clara, pp. 25–28, Feb. 1996.

\* cited by examiner

*Primary Examiner*—Do Hyun Yoo
*Assistant Examiner*—Nasser Noazzami
(74) *Attorney, Agent, or Firm*—Daniel J. Piotrowski

(57) ABSTRACT

The invention relates to a storage system (100) such as a video on demand system, comprising a plurality of storage units (110–120) such as disk drives. Each one of the storage units (110–120) has a number of storage zones (121–126) with mutually different expected data retrieval times. Data is stored in data units, with each data unit comprising N blocks, wherein $N \geq 2$. The blocks of a data unit are distributed over the storage units (110–120). The blocks comprise redundant information such that any one of a plurality of selections comprising N–K of the N blocks suffices for retrieving the data unit, wherein $K \geq 1$. For retrieving a data unit from the storage units (110–120), a reader determines which N–K of the N blocks to retrieve on the basis of a selection procedure. In accordance with the invention, the selection procedure takes into account the expected data retrieval times in order to optimize bandwidth utilization.

7 Claims, 1 Drawing Sheet

STORAGE SYSTEM

BACKGROUND OF THE INVENTION

The invention relates to a storage system such as a video on demand system, comprising a plurality of storage units for storing blocks of data such as video or audio data, and a reader for retrieving the blocks from the plurality of storage units.

A video on demand system is known from the article "Randomized data Allocation for Real-time Disk I/O", Compcon '96 (41st IEEE Computer Society International Conference, Santa Clara, Feb. 25–28, 1996). In the known system a data unit is striped over G disks forming a group of G blocks, each occupying one full track on a disk. The group of G disks are randomly selected from the set of D available disks. One of the G blocks is a parity block. The random distribution of the groups results in balancing of the load on the disks. The redundant parity block enables further load balancing, which is achieved by reading only those (G-1) blocks of a group of G blocks that minimize the load. If the unread block is a data block, the parity block is used to reconstruct the unread data block.

SUMMARY OF THE INVENTION

It is an object of the invention to provide a storage system as specified in the preamble, which more efficiently uses disk bandwidth. To this end, the invention provides a storage system as defined in claim 1.

In a storage unit that uses movement of a read head with respect to a storage medium for retrieval of data, an example of such a storage unit being a disk drive, the expected retrieval time of some piece of data comprises as a first component the switch time required to position the head on the right location, e.g. on the right track and on the right position within that track, and as a second component the time necessary for the actual read process. If we assume that large amounts of contiguous data are read at a time, the expected retrieval time of a piece of data is largely determined by this second component. As in most storage units the time needed for actually reading an arbitrary piece of data depends on the location of that piece of data within the storage space, the expected retrieval time varies across the storage space. In a disk drive, for example, the storage capacity of the outer tracks is higher than that of the inner tracks. In current disk drives, the track capacity does not vary continuously but stepwise, so that a finite number of storage zones can be identified, typically in the order of ten to twenty, in each of which all tracks have equal storage capacity. In view of the constant angular velocity of a disk drive, the expected retrieval time of a block stored in a storage zone close to the spindle of the disk drive is higher than that of a block stored in a storage zone near the outer perimeter of the disk. In accordance with the invention, a selection procedure is used that takes into account the expected retrieval time, which enables more efficient use of the available disk bandwidth by preferably selecting blocks with low expected retrieval time for retrieval. This is especially advantageous for video servers in which disk bandwidth determines the system bottleneck instead of the storage capacity. More efficient use of disk bandwidth also results in less stringent buffer requirements and better response times.

Preferably, the selection procedure further takes into account a load distribution in the plurality of storage units. In this way, the freedom that is offered by the redundant information is used for achieving both load balancing and improvement of bandwidth utilization at the same time. A further advantage is that the minimal overall retrieval time of a data unit fluctuates less from one data unit to another. The selection procedure could be invoked on each requested data unit individually, in which case the selection procedure tries to determine the best selection in accordance with some criteria without regarding other data units. Alternatively, the selection procedure could be invoked on a batch of data units pending to be served. In the latter way, the freedom can be utilized even better for load balancing and/or improving the bandwidth utilization. For example, a selection that is optimal for a particular data unit might cause problems for subsequent data units from a load balancing point of view. In such a case, for the selection procedure it is better to address a number of data units at a time.

At an arbitrary moment in time, each storage unit has an empty or a non-empty queue of read requests for respective blocks that are waiting to be retrieved from that storage unit. As the load distribution to be taken into account, the selection procedure could take the queue lengths as a starting point, i.e. the selection procedure could have as objective to level the queue lengths. Alternatively, the selection procedure disregards the actual queue lengths and merely tries to equally distribute the load of the current requested data unit or batch of data units over the storage units. Both methods are essentially the same when the selection procedure is invoked after the blocks of the previous data unit or batch of data units have been retrieved, since at that moment the queue lengths are zero.

Further advantageous aspects of the invention are described in the dependent claims.

The invention also relates to a storage system comprising a plurality of storage units and a loader for storing data units in the storage system. The invention further relates a method of storing and a method retrieving data units in a system comprising a plurality of storage units.

These and other aspects of the invention will be apparent from and elucidated with reference to the embodiments described hereinafter.

DETAILED DESCRIPTION OF THE PREFERRED EMBODIMENTS

Figure 1:
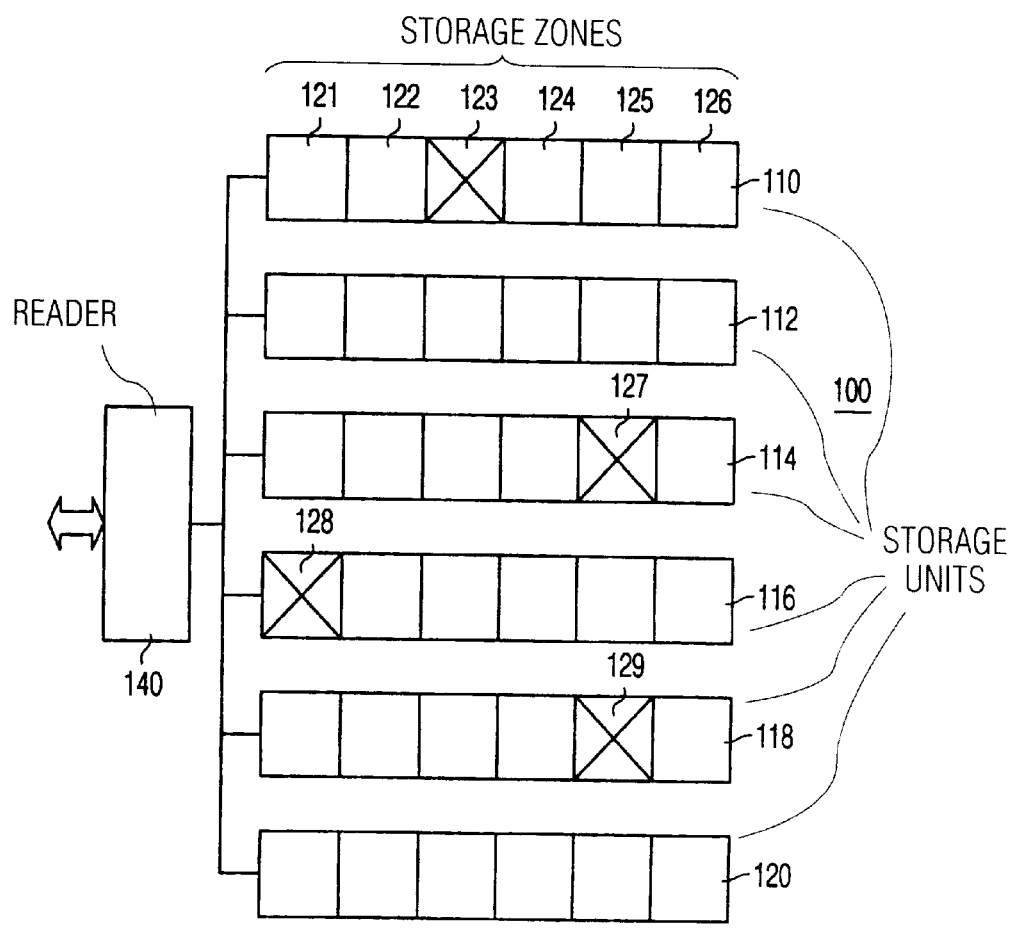
FIG. 1 shows a schematic diagram of a system in accordance with the invention, and FIG. 2 graphically shows a step of a second embodiment of a selection procedure that could be used in the system of the invention.

FIG. 1 shows a schematic diagram of a system in accordance with the invention. Each horizontal bar 110–120 schematically represents a storage unit. In the present embodiment, each storage unit 110–120 is assumed to be a disk drive. Each storage unit 110–120 is subdivided into six storage zones. Storage unit 110, for example, comprises storage zones 121–126. Each storage zone 121–126 comprises a number of circular tracks having the same storage capacity. Alternatively, each storage zone 121–126 could comprise a number of tracks having approximately the same storage capacity. Then, what is considered as a storage zone is actually a collection of several physical storage zones of constant storage capacity. Tracks that are located near the outer perimeter of the disk drive have a higher storage capacity than tracks that are located close to the spindle of the disk drive. In view of the constant angular velocity of a disk drive, the expected retrieval time of a block stored in a storage zone close to the spindle of the disk drive is higher than that of a block stored in a storage zone near the outer perimeter of the disk. In FIG. 1, it is assumed that the expected retrieval time decreases from left to right. For example, storage zone 121 comprises the tracks near the spindle and storage zone 126 comprises the tracks near the outer perimeter.

It is further assumed that data that is stored in the system 100 (for example a movie) is arranged in data units of four blocks. Each data unit could correspond to a self-contained piece of data (for example a video frame or several video frames) or to just a fixed amount of data with no particular relation to the character of the data. Preferably, the size of a block is an integer number of tracks. Normally, each block only partly fills a storage zone. Alternatively, the number of storage zones or the size of the blocks is increased so that the blocks and the storage zones have approximately the same size. The system 100 further comprises a reader 140 for retrieving the blocks from the storage units 110–120 and for distributing the retrieved blocks to clients.

The four blocks making up a data unit are distributed in a random or near-random fashion over the storage units 110–120. In FIG. 1 the four storage zones comprising the four blocks of an arbitrary exemplary data unit are storage zones 123, 127, 128 and 129. The four blocks comprise redundant information such that retrieval of any two of the four blocks suffices for retrieval of the exemplary data unit. Thus, for retrieval of the exemplary data unit, a total of six selections out of the four blocks could be made. Hereto, in the reader 140 a 10 selection procedure is implemented that is responsible for, on the basis of some criteria, determining which selection to retrieve. It is not essential to the invention that data units comprise exactly four blocks of which only exactly two blocks need to be retrieved. In the context of the invention, a data unit could comprise N blocks with $N \geq 2$, and the added redundancy could be such that N–K blocks need to be retrieved, wherein $K \geq 1$.

In the known system, freedom of selection of blocks is also present and is used for the purpose of balancing the momentary load on the storage units. In the system of FIG. 1, besides the load balancing that is already achieved by the more or less random distribution of the blocks over the storage units, further load balancing is achieved as follows. During normal operation, each storage unit has an empty or a non-empty queue of read requests for respective blocks that are waiting to be retrieved from that storage unit. Suppose that at some instant storage unit 114 is under heavy load, i.e. the queue of read requests for storage unit 114 is longer than that of the other storage units 110, 112, 116–120. For retrieving the exemplary data unit, choosing any one of the three selections in which storage unit 114 is not involved, prevents the queue of storage unit 114 to grow further, resulting in a balanced load. Such a selection comprises, for example, the block that is stored in storage zone 123 and the block that is stored in storage zone 128. A further benefit of having freedom of selection is that, in case one of the storage units 110–120 is out of order or is in the process of being replaced, the system 100 is still able cope with the demand, i.e. to deliver the requested data unit. It is clear that for load balancing it is advantageous when none of the storage units 110–120 comprises more than one block per data unit, so that the number of alternative blocks is maximal. In the context of the invention, it is also allowed that the number of blocks per data unit equals the number of storage units in the system, in which case a data unit, including corresponding redundant data, is striped over all storage units.

Now, in accordance with an aspect of the invention, the freedom of selection is further utilized for increasing bandwidth of the system. Hereto, the selection procedure has a preference for blocks in the faster ones of the storage zones, i.e. for those blocks of the four possible blocks that are closest to the outer perimeter of the disk drive. In other words, the selection procedure takes into account, in one way or another, the expected retrieval times of the blocks. For example, for retrieving the exemplary data unit, the selection procedure could select the block that is stored in storage zone 127 and the block that is stored in storage zone 129.

Preferably, the freedom of selection is used for both load balancing and optimizing bandwidth at the same time. Hereto, the selection procedure further takes into account the momentary load distribution in said plurality of storage units. For retrieving the exemplary data unit of FIG. 1, when indeed storage unit 114 is under a relatively high load, the preferred system would for example select to retrieve the two blocks in storage zones 123 and 129, respectively, thereby not only relieving storage unit 114 but at the same time also improving system bandwidth utilization, i.e. minimizing the total retrieval time of the data unit. Several possible embodiments of a selection procedure achieving both objectives are worked out. A first embodiment works as follows. First, the selection procedure reduces the number of candidate selections to those that discard the most heavily used storage unit. Then, from the remaining three candidate selections, that selection is chosen of which a relatively high number of blocks is located in the faster storage zones. In more general terms, out of the N blocks making up a data unit, L (L<K) blocks are discarded for load balancing and, subsequently, the slowest (K–L) blocks of the remaining N–L blocks are discarded to optimize the system bandwidth.

Figure 2:
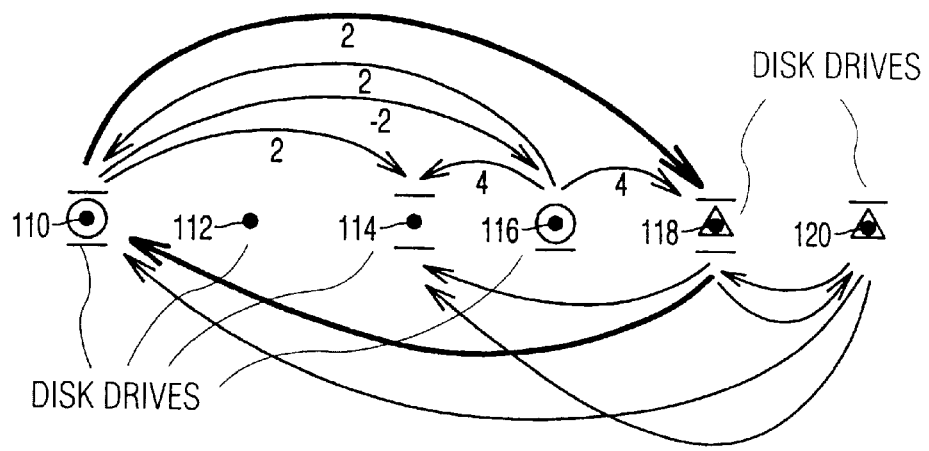

FIG. 2 graphically shows a step of a second embodiment of a selection procedure that could be used in the system of the invention. For load balancing it is generally beneficial to apply a selection procedure to a batch of data unit requests in one time rather than addressing each data unit individually. This is explained in international application PCT/IB98/00720 and corresponding U.S. patent application Ser. No. 09/083,693 (PHN 16375), in which also a number of such load balancing selection procedures are presented, that take into account a number of data units at a time. These selection procedures can be combined with the present invention to produce a new selection procedure in the following manner. In a first step, load balancing is achieved by an arbitrary load balancing selection procedure, for example one of the selection procedures of the cited international application PCT/IB98/00720. In a second step, the aim is to increase the number of blocks that are read from the outer tracks of the disks, while keeping the load of each disk unchanged. This second step can be implemented as follows. Given the initial selection obtained in the first step, a directed weighted graph is constructed, wherein each disk drive 110–120 is represented as a node. An example of such a graph is shown in FIG. 2. Furthermore, it is assumed that the blocks of a first data unit are distributed like the blocks of the exemplary data unit of FIG. 1, which is indicated in the graph by dashes under the nodes 110, 114–118, the dashes indicating that these storage units contain blocks of the first data unit. Similarly, a second data unit is assumed to be present with its blocks contained in storage units 110, 114, 118, 120, which is indicated in FIG. 2 by dashes above the relevant nodes 110, 114, 118,120. Moreover, it is assumed that after the first step, there is a preliminary selection that is acceptable from the viewpoint of load balancing, which selection involves retrieving the first data unit from storage units 110 and 116 (indicated in FIG. 2 by circles) and retrieving the second data unit from storage units 118 and 120 (indicated in FIG. 2 by triangles).

The graph further comprises, for each one of the four preliminary selected blocks, three arrows (v,w) from node v to w, in which node v contains the selected block and node w is one of the three nodes containing alternative blocks of the relevant data unit. For example, three arrows leave node 110 and are directed towards nodes 114–118, respectively, the latter containing the other blocks of the first data unit. To each arrow (v,w) a weight is attributed that expresses what can be gained by using node w instead of node v for retrieving the data unit. Hereto, each storage zone in a storage unit is given an ordinal number 1–6, with the ordinal number increasing with the expected data retrieval time. The weights are taken to be the difference between the ordinal numbers of the storage zones relevant nodes, these weights being shown next to the arrows. For example, the arrow from node 110 to node 118 has weight 2, as the storage zone of the storage unit 110 containing a block of the first data unit has ordinal number 3, and the storage zone of the storage unit 118 containing a block of the first data unit has ordinal number 5, which can be seen from FIG. 1. It is further assumed that the blocks pertaining to the second data unit are all located in the slowest storage zone of each respective storage unit. That results in the weights in the arrows relating to the second data unit being zero, which weights are left out of FIG. 2 for clarity. Many alternative ways of attributing weights to the arrows are possible without departing from the principles of the invention.

A cycle is a closed succession of arrows $\{(v_1,v_2), (v_2,v_3), \ldots (v_k,v_1)\}$. A cycle for which the sum of the weights along the arrows is positive corresponds to an adjustment of the initial retrieval selection by 'transferring' one block along the arrows, resulting in an increase of the number of blocks that are read from the faster storage zones. Clearly, the load of each disk is not changed, since each disk involved in the exchange still has to retrieve the same number of blocks. After carrying out the exchange, the graph must be adjusted as follows: each arrow (v,w) involved in the exchange is replaced by an arrow (w,v), where the weight of the new arrow is the negation of the weight of the deleted arrow.

In the simple example of FIG. 2, it is immediately clear that only storage units 110 and 118 can be used in the swapping process as these are the only storage units selected in the preceding first step that contain blocks of both data units. Therefore, the only swap that can be made in order to increase bandwidth utilization without changing the load distribution is the swap indicated by the bold arrows, i.e. for the first data unit reading a block from storage unit 118 instead of from storage unit 110, and vice versa for the second data unit. When more data units are considered at the same time, the problem becomes too complex to solve at sight, and the search for cycles has to be automated. It will be clear that the above strategy can be implemented in various ways. For example, one could restrict the search to cycles of a given maximum length. Also, alternative graph representations are possible, where between two nodes v,w we have only one (undirected) "arrow", having four weights representing: (1) the number of blocks to be retrieved from v that can be retrieved from a faster storage of w, (2) the number of blocks to be retrieved from v that can be retrieved from a slower storage zone of w, (3) the number of blocks to be retrieved from w that can be retrieved from a faster storage zone of v, and (4) the number of blocks to be retrieved from w that can be retrieved from a slower storage of v.

In the above selection procedures it is assumed that for retrieving the data unit it suffices to retrieve any two of the four blocks corresponding to the data unit. A simpler implementation would consist of storing two copies of each one of the two blocks of a data unit to be stored in the system. In other words, each data unit comprises four blocks that are pair-wise identical. This effectively reduces the size N of a data unit to two and the number of redundant blocks K to one, with the blocks of a data unit being copies of one another. From the graph of FIG. 2 a number of arrows would have to be deleted as no longer all blocks of a data unit can be exchanged for one another. The situation (N,K) =(2,1) is extensively described in the cited international application PCT/IB98/00720.

In the above selection procedures, load balancing and improvement of system bandwidth utilization are achieved in two separate steps. A third embodiment of a selection procedure that could be used in the system of the invention requires only one step. Hereto, the selection procedure selects on the basis of a modified queue length that takes into account the location of the blocks. Each entry in the queue is weighted to account for the expected worse case retrieval time. For example, a read request for a block that is stored near the spindle gets a higher weight than a request for a block near the outer perimeter. Those (N–K) blocks are selected that are stored on the storage units with least modified queue length. Alternatively, when a batch of data units is dealt with by the selection procedure simultaneously, the blocks that are selected are those achieving leveling of the modified queue lengths, thereby considering the momentary modified queue lengths of the storage units, or those having a level distribution over the storage units among themselves. Any kind of load balancing selection procedure, such as those of the cited international application PCT/IB98/00720, can be modified as described here in order to simultaneously achieve load balancing and optimize bandwidth utilization.

It will be clear that the performance of the storage system in accordance with the invention will for a large part be determined by the load strategy, i.e. by the way the data is stored on the plurality of storage units. A loader has the task of converting a data unit to be stored in the system into N blocks to be stored, thereby including redundant information into the blocks such that only N–K blocks need to be retrieved for retrieving the data unit, and storing each one of the N blocks to be stored in a different one of the storage units. As already remarked, from a load balancing view point, it is advantageous to randomly or pseudo-randomly distribute the N blocks over N different storage units. In view of the invention, it is further advantageous to also take into account the expected data retrieval times while distributing the N blocks, such that the blocks of a data unit are more or less equally distributed over storage zones with a higher and storage zones with a lower expected data retrieval time. This could be achieved by choosing storage zones randomly or pseudo randomly as well. Alternatively, the blocks of each data unit could be carefully distributed over slower and faster storage zones by some algorithm.

If, for example, each data unit comprises two blocks that are copies of one another (so N=2 and K=1), the loader could store a first block in one of the inner tracks and a second block in one of the outer tracks of the disk drive. Note that in this example the storage zones that the selection procedure considers, i.e. the group of inner tracks and the group of outer tracks, respectively, do not actually coincide with physical storage zones, the latter in a disk drive usually comprising a larger number than just two. If we assume that the selection procedure considers a batch of data units at a time, it will try to select as much blocks of the outer tracks, and at the same time try to achieve load balancing. Hereto, the selection procedure in accordance with the invention could be based on an arbitrary load balancing algorithm, provided that the expected retrieval times in the different storage zones is accounted for. If for example the expected retrieval time of the blocks in the outer tracks (outer blocks) is 4/5 of the expected retrieval time of the blocks in the inner tracks (inner blocks), the selection procedure could try to minimize a weighted sum of the number of inner blocks and outer blocks, instead of trying to minimize just the maximum number of blocks per storage unit. Hereby an inner block gets weight 5 and an outer block gets weight 4. Several different selections could now get the same weighted sum. For example, four inner blocks and five outer blocks have weighted sum forty, but also eight inner blocks or ten outer blocks have that weighted sum. As a further refinement, it could be taken into account that it is advantageous to read less blocks because the switch time will then be less. By explicitly discriminating between inner and outer blocks, the worst case switch time is found to be less. This further improves bandwidth utilization. The extra gained bandwidth utilization could be converted into less buffering.

It should be noted that the above-mentioned embodiments illustrate rather than limit the invention and that those skilled in the art will be able to design many alternative embodiments without departing from the scope of the appended claims. In the claims, any reference signs placed between parentheses shall not be construed as limiting the claim. The invention can be implemented by means of hardware comprising several distinct elements, and by means of a suitably programmed computer. In the device claim enumerating several means, several of these means can be embodied by one and the same item of hardware.

What is claimed is:

1. Storage system (100) comprising:

a plurality of storage units (110–120), each one of which comprising a plurality of storage zones (121–126) having mutually different expected data retrieval times, at least one data unit being stored in said plurality of storage units (110–120), said data unit comprising N blocks, wherein N≧2, the blocks comprising redundant information such that any one of a plurality of selections comprising N–K of the N blocks suffices for retrieving the data unit, wherein K≧1; and a reader for retrieving said data unit from the plurality of storage units (110–120), the reader being arranged for determining a particular one of said plurality of selections on the basis of a selection procedure, the selection procedure taking into account said expected data retrieval times.

2. Storage system as claimed in claim 1, wherein the N blocks are stored in N different ones of said storage units (110–120) and the selection procedure further takes into account a momentary load distribution in said plurality of storage units (110–120).

3. Storage system as claimed in claim 2, wherein the selection procedure in a first step aims at load balancing and in a second step aims at improvement of bandwidth utilization.

4. Storage system as claimed in claim 2, the selection procedure optimizing in which both the momentary load distribution of the system and the expected retrieval times are accounted for.

5. A storage system (100) comprising:

a plurality of storage units (110–120), each one of which comprising a plurality of storage zones (121–126) having mutually different expected data retrieval times;

a loader for storing a data unit in said plurality of storage units, said loader being arranged for converting said data unit into N blocks, wherein N≧2, the blocks comprising redundant information such that any one of a plurality of selections comprising K of the N blocks suffices for retrieving the data unit, wherein K≧1 and for storing said N blocks in said plurality of storage units such that each storage unit comprises at most one of said N blocks and that said N blocks are distributed at least approximately equally among faster and slower ones of said storage zones.

6. A method of retrieving data units from a system (100) comprising a plurality of storage units (110–120), each one of which comprising a plurality of storage zones (121–126) having mutually different expected data retrieval times, at least one data unit being stored in said plurality of storage units (110–120), said data unit comprising N blocks, wherein N≧2, the blocks comprising redundant information such that any one of a plurality of selections comprising N–K of the N blocks suffices for retrieving the data unit, wherein K≧1, the method comprising the steps of:

determining a particular one of said plurality of selections, thereby taking into account said expected data retrieval times; and retrieving the blocks pertaining to that particular selection.

7. Method of storing a data unit in a system (100) comprising a plurality of a storage units (110–120), each one of which comprising a plurality of storage zones (121–126) having mutually different expected data retrieval times, the method comprising the steps of:

converting said data unit into N blocks, wherein N≧2, the blocks comprising redundant information such that any one of a plurality of selections comprising N–K of the N blocks suffices for retrieving the data unit, wherein K≧1;

storing said N blocks in said plurality of storage units such that each storage unit comprises at most one of said N blocks and that said N blocks are distributed at least approximately equally among faster and slower ones of said storage zones.

* * * * *